April 6, 1965 W. L. ROEVER 3,176,787
SEISMIC SOUND SOURCE
Filed June 22, 1961 2 Sheets-Sheet 1

INVENTOR:
W. L. ROEVER
BY Theodore E. Bieber
HIS ATTORNEY

April 6, 1965  W. L. ROEVER  3,176,787
SEISMIC SOUND SOURCE
Filed June 22, 1961  2 Sheets-Sheet 2

INVENTOR:
W.L. ROEVER
BY: Theodore E. Bieber
HIS ATTORNEY

United States Patent Office 3,176,787
Patented Apr. 6, 1965

3,176,787
SEISMIC SOUND SOURCE
William L. Roever, Bellaire, Tex., assignor to Shell Oil Company, New York, N.Y., a corporation of Delaware
Filed June 22, 1961, Ser. No. 118,934
9 Claims. (Cl. 181—.5)

This invention pertains to seismic equipment and more particularly to a sound source for use with a continuous seismic profiling system.

In a copending patent application entitled, "Seismic Surveying System for Water-Covered Areas," of Noyes D. Smith, Jr., Serial No. 34,028, filed June 6, 1960, there is described a method and apparatus for conducting a seismic survey of water-covered areas. This copending application describes a method of seismic surveying in which a linear sound source is towed through the water by a vessel and periodically activated to generate seismic impulses. The seismic impulses are received by a plurality of detectors which are also streamed behind the towing vessel. As explained in the above referenced copending application, the use of a linear sound source has several advantages over the prior art method of using explosives that in effect are point sound sources. The copending application also describes a method by which an explosive gas mixture may be introduced into a long flexible tube and then exploded to provide a linear sound source. In the system described, acetylene and oxygen are admitted to the elongated tube, then mixed and exploded by a spark discharge device. The force of the explosion exhausts the gas from the trailing end of the tube and permits a new charge to be introduced through the leading end of the tube. Although the linear sound source is particularly advantageous, a significant proportion of the energy provided by each explosion may be wasted in stretching the wall of a flexible tube that has a generally cylindrical configuration. The stretching of the tube may also limit the life of the tube and require frequent replacements of the tube.

It has been discovered that in order to provide the largest amount of seismic energy from any given amount of gas the gas resulting from the explosion should be able to freely expand to at least five times its original volume and preferably to 10–20 times its original volume. Provisions should be made in the tube for the gas to freely expand and not require the expanding gas to stretch the wall of the tube in which the explosion occurred.

Accordingly, it is a principal object of this invention to provide an improved sound source for a seismic surveying operation in which explosive gas mixtures are introduced into an elongated tube and then exploded. The elongated tube is provided with a combination of a flexible wall which may freely expand and a structural strengthening means for preventing collapse of the tube beyond a minimum volume.

A further object of this invention is to provide a seismic sound source in which an elongated tube having a flexible wall structure is used. The elongated tube is provided with a structural means that extends the length of the tube and prevents collapse of the tube beyond a minimum volume yet permits the tube to readily expand to a volume at least five times the minimum volume.

The above objects and advantages of this invention are achieved by providing an elongated tube having walls formed of a flexible material for example rubber. The tube is provided with a structural means extending the length thereof that prevents the collapse of the tube beyond a predetermined minimum volume. The volume selected as the minimum volume is such that the tube may freely expand to at least five times this volume and preferably 10 to 20 times the minimum volume. Means are provided in one end of the tube for introducing an explosive gas and a supply of compressed air or oxygen, and mixing the gas and air supply to provide an explosive mixture. A means for igniting the explosive gas, such as a spark discharge device, is provided adjacent the one end of the tube to ignite the gas to generate the seismic explosion. The other end of the tube is provided with a means, such as a discharge outlet which is led to the surface of the water, to discharge the gas from the tube after the explosion at a pressure less than the hydrostatic pressure on the outside of the tube. Suitable check valves are provided in the inlet to prevent the explosion from traveling back through the inlet tubes and igniting the gas supply on the towing vessel. A similar check valve is provided at the discharge end of the tube to permit the gases to be discharged freely therefrom but prevent the entrance of water or other fluids into the tube through the discharge opening.

The cross-sectional shape of the tube may be of various designs adapted to permit the expanding gas to freely expand in a manner that does not require energy to stretch the tube wall. One design which has been found satisfactory consists of a circular center section and two narrow lateral areas extending in diametrically opposite directions from the center section. The portion of the tube wall enclosing the narrow lateral sections is maintained relatively thin while the tube wall around the center section is of sufficient thickness to prevent the collapse of the center section due to the differential pressure exerted on the outside of the tube when the gases have been exhausted therefrom. The explosive gas mixture is introduced to the center section of the tube and exploded. The force of the expanding gas as a result of the explosion expands the tube to a much larger cross-section. The expulsion of the gases will reduce the pressure within the tube and permit the hydrostatic pressure due to the water pressure on the outer surface of the tube to collapse the tube. In order to reduce the back pressure on the discharge opening it is preferable to extend the discharge opening to the surface of the water or at least to a depth shallower than the depth of the tube and permit the tube to exhaust to a pressure less than the pressure on the outside of the tube. Exhausting to the surface provides a simple means by which a uniformity of the explosions may be obtained. With this arrangement the tube is always filled by injecting gas against atmospheric back pressure.

The above objects and advantages of this invention will be more easily ascertained from the following detailed description of preferred embodiments when taken in conjunction with the attached drawings, in which.

Figure 1:
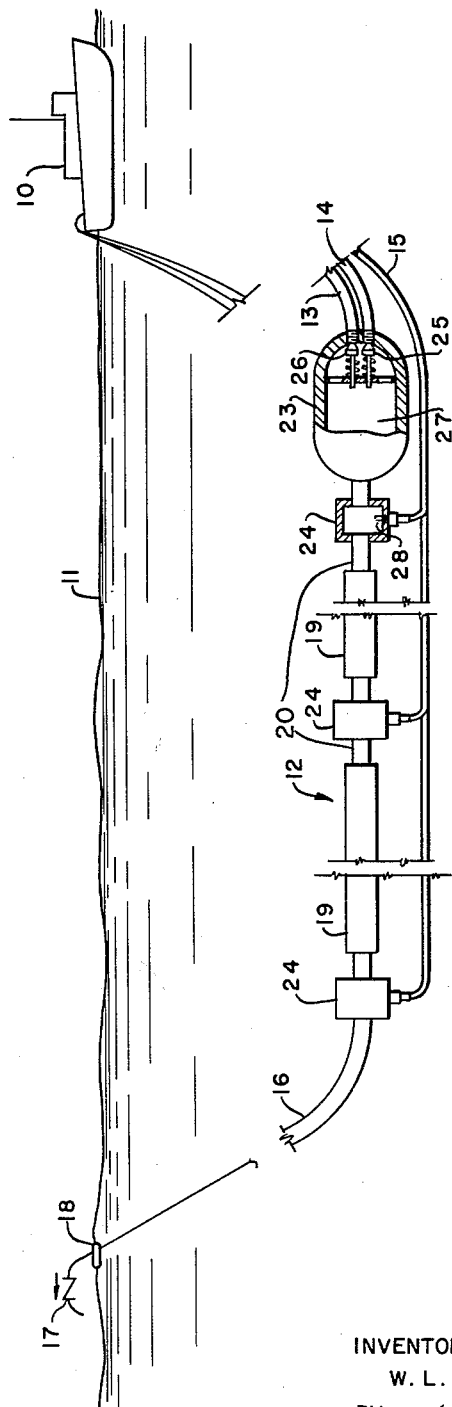
FIGURE 1 is a schematic representation partially in elevation and partially in section of a vessel towing a tubular seismic energy source constructed in accordance with this invention.

Referring now to FIGURE 1, there is shown a towing vessel 10 moving along the surface of a body of water 11.

The vessel tows behind it a seismic energy source 12 constructed from a plurality of individual tubular sections in accordance with this invention. The forward end of the source 12 is coupled to a gas supply (not shown) located on the vessel 10 by conduits 13 and 14 which in addition to supplying an explosive gas to the source may also serve as a towing cable for the source. An electrical circuit 15 is provided to supply electrical current to the spark discharge devices when it is desired to initiate a seismic explosion. The discharge or aft end of the last tubular section of the source 12 is coupled to a conduit 16 whose open end 17 is disposed above the surface of the water body 11 and provided with a check valve 17. In order to insure that the end 16 remains above the surface a float member 18 may be provided on the conduit 15. The operation and streaming of a tubular seismic sound source as shown in FIGURE 1 is more fully described in the referenced copending application.

Figure 2:
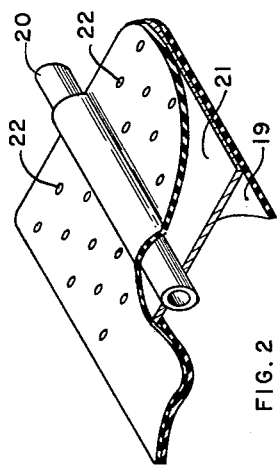
FIGURE 2 is a perspective drawing partly in section of the forward end of the tube forming the seismic energy source of FIGURE 1.

Referring now to FIGURES 1 and 2, there is shown the detailed construction of a section of the source 12, an igniting unit and the housing or fish that contain valves for controlling the gas flow between the gas supply on the vessel 10 and the source 12. Each end of each section of the tube 19 is closed by a plate member 21 having a tubular member 20 formed integrally therewith, only one end being shown in FIGURE 2. The plates 21 may be sealed in the inlet and outlet ends of the tube 19 by various means, for example molding it directly in place and using fastening means, such as bolts 22. The plate member 21 serves to both seal the narrow lateral areas of the tube and provide reinforcements on the leading and trailing ends of the tube to prevent physical damage thereto as the tube is towed through the water. The end of the rigid tube 20 is coupled to the igniting units 24 which are disposed between individual sections 19 of the source as shown in FIGURE 1. The igniting unit 24 of the first section of tube 12 is coupled to a housing or fish 23 that contains two check valves 25 and 26 disposed to permit flow of gas from the vessel 10 into the mixing chamber 27 of the fish 23. The mixing chamber of the fish should have sufficient volume to permit mixing of the gas and air to obtain an explosive mixture. A spark discharge device 28 is mounted in the igniting unit 24 to explode the gas mixture when desired. The spark discharge device is coupled to a firing circuit at the surface by means of the circuit 15 shown in FIGURE 1.

Figure 3:
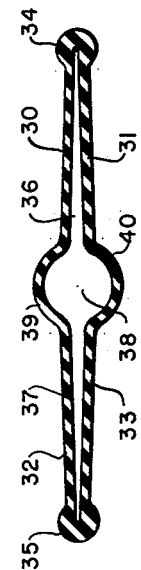
FIGURE 3 is a cross-section of the tube shown in FIGURE 1.
Figure 4:
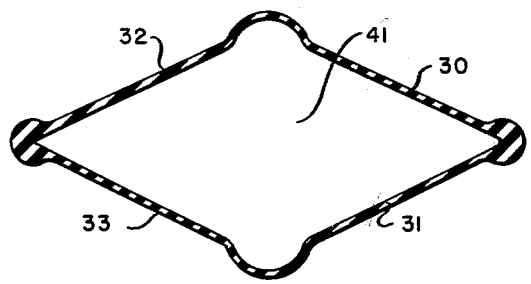
FIGURE 4 is a cross-section of the tube shown in FIGURE 1 in an expanded condition.

Referring now to FIGURES 3 and 4 there is shown a cross section of the tube 19 in a collapsed position and in an expanded position, respectively. The tube 19 is preferably molded of a flexible material such as natural rubber or synthetic rubber and may include a reinforcing material such as fabric or the like. The tube 19 is provided with a substantially circular central area 38 and two narrow lateral areas 36 and 37 that extend in diametrically opposite directions from the central area. The lateral area 36 is enclosed by relatively thin flexible walls 30 and 31 of the tube while the lateral area 37 is enclosed by similar thin flexible walls 32 and 33. The end of the lateral area 36 is closed by a slightly thickened wall section 34 of the tube while the lateral area 37 is closed by a similar section 35 of the tube 19. To prevent the collapse of the tube beyond the minimum area which is equal to the central area 38 the tube walls are considerably thickened where they surround the central area. The thickened sections 39 and 40 provide sufficient structural strength to prevent the collapse of the tube. If the tube is to be towed at a considerable depth where the pressure differential due to the water depth will be large, it may be necessary to insert reinforcing material in the sections 39 and 40 of the tube. In most instances where the tube is towed at shallow depths no reinforcement will be necessary and the heavy wall sections 39 and 40 will be sufficient to prevent the collapse of the tube beyond the minimum volume having the circular cross section.

Referring to FIGURE 4, the tube is shown in the expanded condition resulting from the expansion of the exploded gas. FIGURE 4 also shows the cross section of the tube expanded to an area 41 which is approximately ten times the area of the circular central section 38 shown in FIGURE 3. This expansion of the cross sectioned area of the tube is accomplished by increasing the area of the lateral sections 36 and 37 of the tube. The expansion requires that the walls 30 and 31 of the lateral area 36 and the walls 32 and 33 of the lateral section 37 be moved apart into a triangular shape as shown in FIGURE 4. This movement can be accomplished without requiring any great amount of energy of the expanding gases.

The operation of the above-described sound source is more fully and completely described in the referenced copending application. Briefly, this operation consists of charging a known quantity of explosive gas mixture into the mixing chamber 27 of the fish 23 as it is towed behind the vessel 10. The charge is exploded in the ignitor unit 24 when desired by energizing the spark gap 23. When the charge explodes the expanding gas will force the individual tube sections 19 into the configuration shown in FIGURE 4. As the gas expands it will overcome the atmospheric pressure holding the check valve in the conduit 16 closed and permit the gases to be exhausted through the tube 16, and observed through the open end 17 thereof. As the gases are exhausted the pressure within the tube sections 19 will be lowered permitting the hydrostatic pressure to again collapse the tube sections. As explained above, the tube sections will collapse until the walls enclosing the lateral areas 36 and 37 substantially touch but further collapse of the tube will be prevented by the thickened wall sections 39 and 40 which enclose the central area 39 of the tube. This will insure that in the collapsed state the tube sections will have a predetermined minimum volume for receiving the next charge of explosive gas.

As explained above, it has been discovered that the tube must be provided with a minimum volume for receiving the explosive gas charge and yet be capable of freely expanding to a volume of at least five times and preferably 10 to 20 times this minimum volume. A tube constructed in this manner will generate a maximum amount of seismic energy for a given charge of explosive gas mixture. Likewise, a minimum of the energy of the explosive gas will be dissipated in overcoming strength of the tube in an attempt to expand the tube to accommodate the increased volume of gas when the mixture is exploded. From an inspection of FIGURES 3 and 4, it can be appreciated that the tube of this invention is provided with a minimum cross-sectional area and yet may be readily expanded to a cross-sectional area approximately ten times its minimum area with the expenditure of a minimum of energy from the expanding gases in deforming the walls. This makes a maximum amount of energy available for compressing the water to generate a seismic impulse.

As shown in FIGURE 1, the sound source 12 consists of two tube sections 19 joined by an igniting unit 24 with additional igniting units placed at each end of the source 12. Each of the ignitor units are coupled to the circuit 15 to insure that the gas in all portions of the sound source will explode simultaneously to improve the uniformity of the explosion. While only two tube sections 19 are shown, obviously more sections could be used or fewer sections depending upon the area being surveyed and the quantity of gas introduced into the sections. The use of separate sections also permits replacement of individual sections thus reducing the overall cost of operating the exploration unit.

Figure 5:
FIGURE 5 is a cross-section of a tube which may be used in place of the tube shown in FIGURE 1.

Referring to FIGURE 5, there is shown a cross-section of a modified tube having two circular areas 50 and 51 located at each edge of the tube. The two circular areas are connected together by a narrow lateral area 52 enclosed by relatively thin flexible walls 55 and 56. The circular area 50 is enclosed by a heavy walled section 53 of the tube while the circular area 51 is enclosed by a similar heavy walled section 54. This construction is similar to that described above with reference to FIGURE 3 except that two circular sections are used.

In a preferred arrangement, gases, such as acetylene and oxygen, are separately conveyed to the near end of one circular area such as 50. The gases are mixed in the near end of area 50 and thet mixture is conveyed to the far end of the tube through this area. At the far end, the mixture is fed from area 50 to area 51. In area 51 the mixture is conveyed back along the tlube to exhaust through a conduit such as conduit 15 having an open end 16 which is supported from the boat in a position above the water. Of course, after the gases are mixed they are exploded by a spark discharge when it is desired to generate a seismic impulse. The expansion of the exploded gases causes the tube to expand to a diamond shape similar to FIGURE 4.

Figure 6:
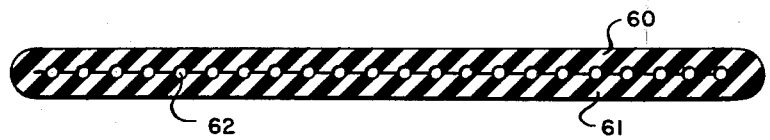
FIGURE 6 is a cross-section of a third tube which may be used in place of the tube shown in FIGURE 1.
Figure 7:
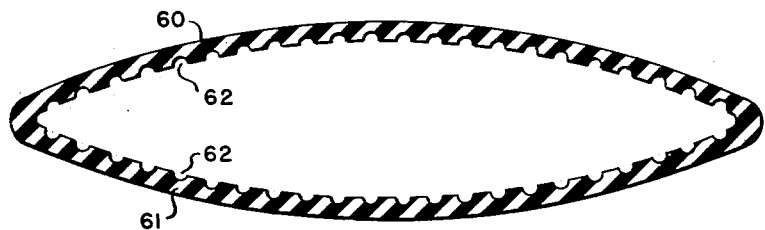
FIGURE 7 is a cross-section of the tube of FIGURE 6 in an expanded state.

FIGURE 6 shows still another construction for the tube section 19 of FIGURE 1. The construction shown in FIGURE 6 has two walls 60 and 61 of substantially uniform thickness with a plurality of uniform circular areas 62 formed therein. As seen in FIGURE 6, the circular areas 62 are formed directly in the walls 60 and 61 and the thickness of the walls 60 and 61 are actually reduced in these areas. The hydrostatic pressure on the tube walls 60 and 61 will cause walls to collapse as shown in FIGURE 6 to reduce the enclosed volume to the volume of the circular areas 62. Complete collapse of the tube will be prevented by the inherent strength of the flexible walls 60 and 61. When the exploding gas mixture expands the tube as shown in FIGURE 7, it can easily assume a substantially oval shape by merely flexing the walls 60 and 61 outwardly. This movement of the walls will be accomplished by the expenditure of only a slight amount of energy.

Figure 8:
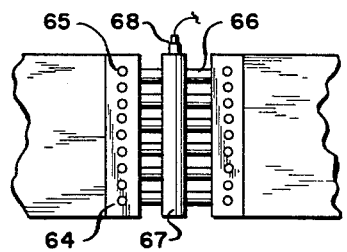
FIGURE 8 is a perspective view of a means for coupling two sections of the tube shown in FIGURE 6 to form a seismic energy source.

Referring to FIGURE 8, there is shown a means for coupling two of the tube sections shown in FIGURE 6 to form a seismic energy source. The ends of the tube sections are provided with plate reinforcing members 64 that have tubes 66 formed integrally therewith. The tubes 66, of course, are aligned with the circular areas 62 of the tube section and communicate with them. The plate reinforcing members 64 are secured to the ends of the tube section by any desired means such as molding them in place and fastening means such as bolts 65. The individual tubes 66 are coupled to an igniting unit 67 formed by a closed end tubular member. The tubes 66 should be coupled to the unit 67 by a releasable means as for example a threaded coupling. A spark gap 68 is disposed in one end of the unit 67 for igniting the gas mixture and coupled to the circuit 15 shown in FIGURE 1. The igniting unit of the first tube section would also be coupled to a fish similar in construction to the fish 23 shown in FIGURE 1.

The tube section shown in FIGURES 6 and 7 is very useful when it is desired to increase the power of the impulse without increasing the low frequencies of the impulse. If the power of the impulse was increased by merely increasing the size of single volume of the tube section shown in FIGURE 2, the lower frequencies would also increase. This is avoided in the tube of FIGURE 6 by using a plurality of small volumes to contain the increased volume of gas mixture required to increase the power of the impulse. The tube section of FIGURE 6 retains all of the advantages of the tube section of FIGURE 2, such as the ability to replace individual sections of the source.

While the above description has been related to the use of this invention in the survey of water-covered areas, it can also be used in seismic surveys of land areas or as a source of seismic energy in a borehole or the like. In the case of a borehole the tube could merely be lowered into the borehole and the gas exploded and then the borehole ventilated to remove the exploding gas mixture. Of course, when the tube was used on land areas it could be exhausted directly to the atmosphere and no problems would arise.

Accordingly, this invention should not be limited to the details described herein but only to its broad spirit and scope.

I claim as my invention:

1. An apparatus for producing acoustic impulses comprising: an elongated tube having a flexible fluid-impermeable wall capable of changing in configuration in response to a small pressure differential across the wall, structural means included in said tube and extending the length thereof for preventing the collapse of said tube beyond a selected minimum volume, said volume being less than one-fifth of the maximum volume of the tube; conduit means coupled to said tube for conducting explosive gas into the tube and exhausting gas from the tube and means communicating with the minimum volume of the tube for initiating the explosion of explosive gas.

2. An apparatus for producing acoustical impulses comprising: an elongated tube having a relatively flat cross section and a flexible wall capable of changing configuration in response to a small differential pressure across the wall, said cross section consisting of a generally circular central portion joined to two readily collapsible lateral portions, said tube having sufficient structural strength to substantially maintain the internal volume of said central portion when said tube is collapsed; conduit means communicating with said central portion for introducing an explosive gas therein and exhaust the mixture after it is exploded and means disposed in communication with said tube to explode said gas mixture.

3. An apparatus for producing a linear source of acoustical impulses along a substantially continuous line comprising: an elongated tube, said tube being formed of a flexible material and having a thin wall compared to the wavelength of the acoustical energy in the flexible material; structural means extending the length of said tube to prevent collapsing of said tube beyond a predetermined minimum volume, said minimum volume being not more than one-fifth of the maximum volume of the tube; first conduit means communicating with one end of said tube for introducing an explosive gas mixture into said tube; firing means disposed in communication with the minimum volume of said tube to explode said gas mixture and second conduit means communicating with the other end of said tube for exhausting said exploded gas mixture.

4. An apparatus for producing a linear source of acoustical impulses along a substantially continuous line comprising: an elongated tube, said tube being formed of a flexible material and having a thin wall compared to the wavelength of the acoustical energy in the flexible material, said tube having a substantially flat cross section in the collapsed state with a circular section in the center, the wall of said tube having sufficient structural strength throughout the length of the tube to prevent the collapse of said circular center section when said tube is in the collapsed state, said circular center section in addition being less than one-fifth of the maximum cross section of the tube when expanded, conduit means for introducing an explosive gas mixture into said tube; firing means communicating with the minimum volume of said tube for exploding said gas mixture and exhaust means for venting the exploded gas mixture.

5. The apparatus of claim 4 wherein the firing means comprises a spark discharge means and a circuit for coupling said spark discharge means to a remote location.

6. An apparatus for producing acoustical impulses for use with a marine exploring unit comprising: an elongated tube closed at both ends, said tube being formed of a flexible material having a thin wall compared to the wavelength of the acoustical impulses, structural means included in wall of said tube and extending the length thereof for preventing the collapse of said tube beyond a selected minimum volume, said volume being less than one-fifth of the maximum volume of said tube; support means fastened to said tube to permit towing said tube in a submerged substantially horizontal position through a body of water; a first conduit means communicating with the interior of the tube at one end for introducing an explosive gas mixture into said tube; a firing means disposed in communication with said tube to explode said gas mixtures and a second conduit means communicating with said tube and extending to the surface of the water body to exhaust said exploded gas mixture.

7. An apparatus for producing a linear source of acoustical impulses along a substantially continuous line comprising: an elongated flexible tube having a relatively flat cross section, and a flexible wall capable of changing configuration in response to small changes in the differential pressure, said cross section consisting of two circular areas joined by a narrow lateral area, said tube having sufficient structural strength to substantially maintain the configuration of said circular areas when said tube is collapsed; conduit means communicating with said circular areas for introducing an explosive gas mixture therein and exhausting the mixture after it is exploded and means disposed in communication with said tube to explode said gas mixture.

8. An apparatus for producing acoustical impulses comprising: an elongated tube having a relatively flat cross section and a flexible wall capable of changing configuration in response to a small differential pressure across the wall, said cross section consisting of at least one generally circular portion joined to at least one radially collapsible portion; said tube having sufficient structural strength to substantially maintain the internal volume of said central portion when said tube is collapsed; conduit means communicating with said central portion for introducing an explosive gas therein and exhaust the mixture after it is exploded and means disposed in communication with said tube to explode said gas mixture.

9. An apparatus for producing a linear source of acoustic impulses along a substantially continuous line comprising: an elongated tubular member formed from a plurality of individual sections joined by igniting units, each of said sections having a flexible wall capable of changing configuration in response to a small differential pressure across said wall, each section in addition having a cross section consisting of a minimum portion joined to at least one readily collapsible portion with a structural means extending the length of said section to prevent the collapse of said minimum portion; conduit means coupled to the igniting unit of the first section for introducing an explosive gas mixture thereto and conduit means coupled to the last section for exhausting the gas from the last section and a circuit means coupled to all of said igniting units for energizing the igniting units to explode the gas.

References Cited by the Examiner
UNITED STATES PATENTS

| 2,440,903 | 5/48 | Massa | 181—.5 |
| 2,627,930 | 2/53 | Woods | 181—.5 |
| 2,679,205 | 5/54 | Piety | 181—.5 |

SAMUEL FEINBERG, *Primary Examiner.*

ALDRICH F. MEDBERG, KATHLEEN H. CLAFFY, *Examiners.*